A. G. F. KUROWSKI.
APPARATUS FOR FASTENING CLOSURE SUPPORTING MEMBERS TO TUBULAR CASINGS.
APPLICATION FILED JAN. 22, 1919.
1,367,878.
Patented Feb. 8, 1921.
3 SHEETS—SHEET 1.
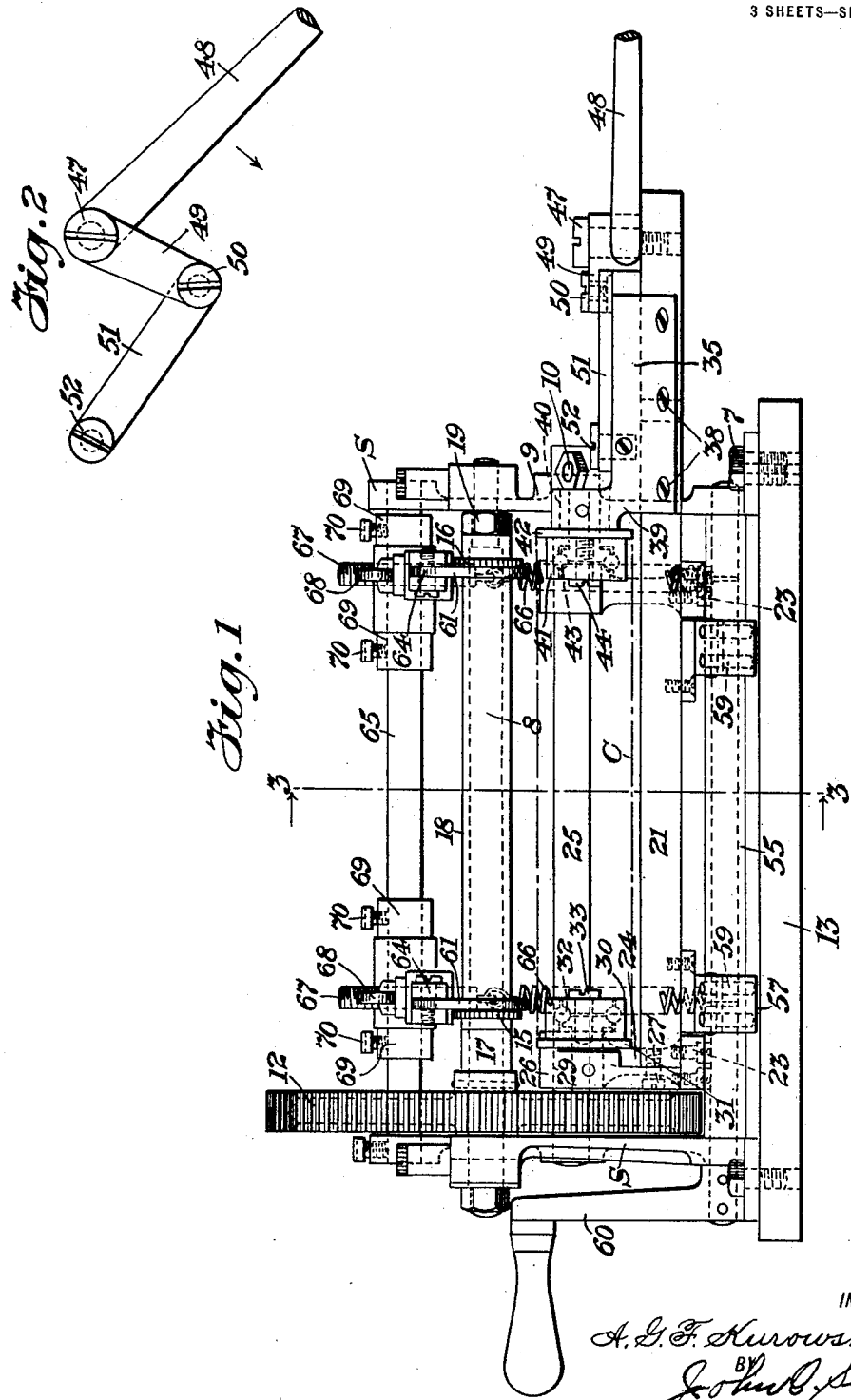
INVENTOR
A. G. F. Kurowski
BY John R. Seifert
HIS ATTORNEY A. G. F. KUROWSKI.
APPARATUS FOR FASTENING CLOSURE SUPPORTING MEMBERS TO TUBULAR CASINGS.
APPLICATION FILED JAN. 22, 1919.
1,367,878.
Patented Feb. 8, 1921.
3 SHEETS—SHEET 2.
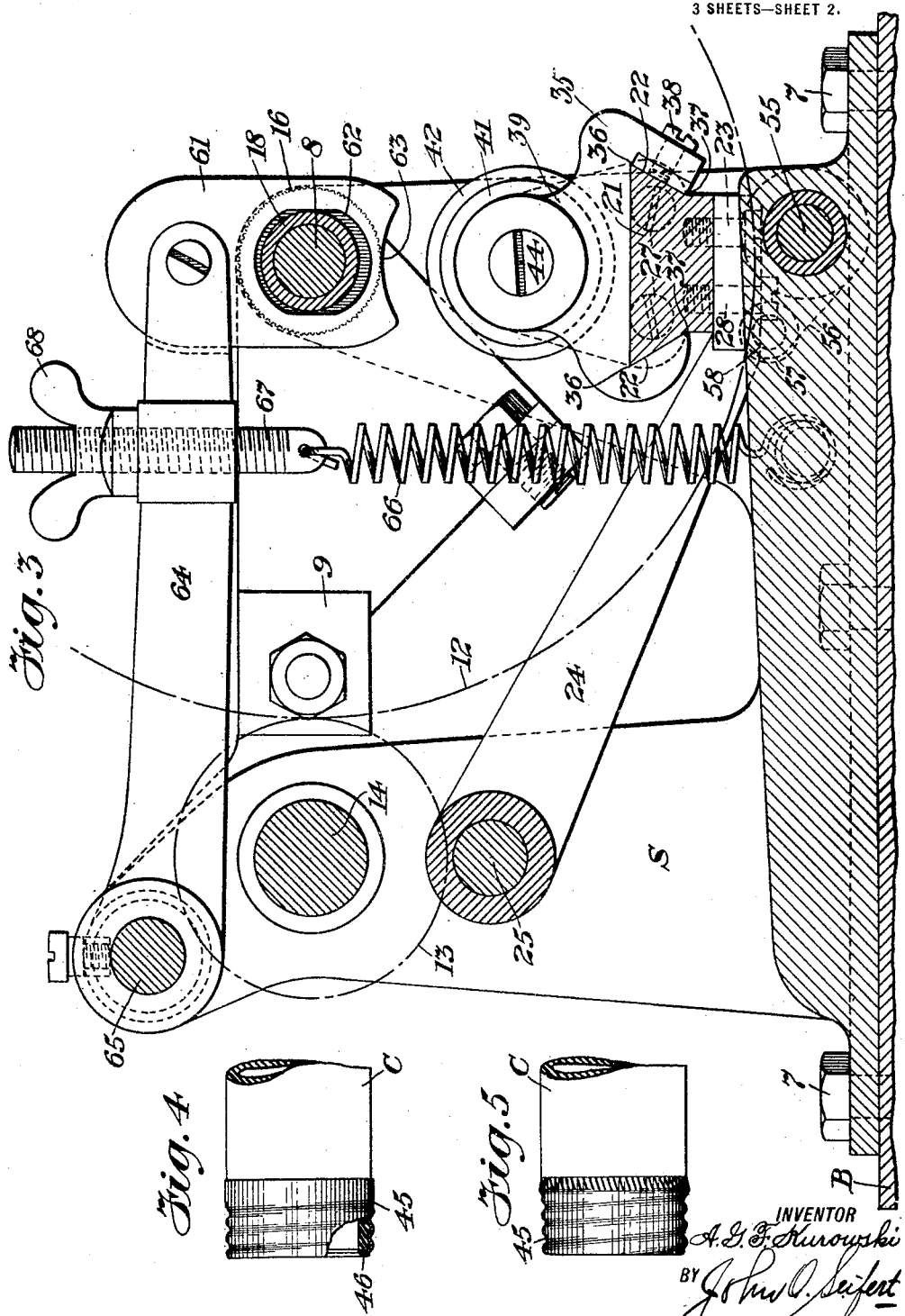
INVENTOR
A.G.F.Kurowski
BY
John O. Seifert
HIS ATTORNEY

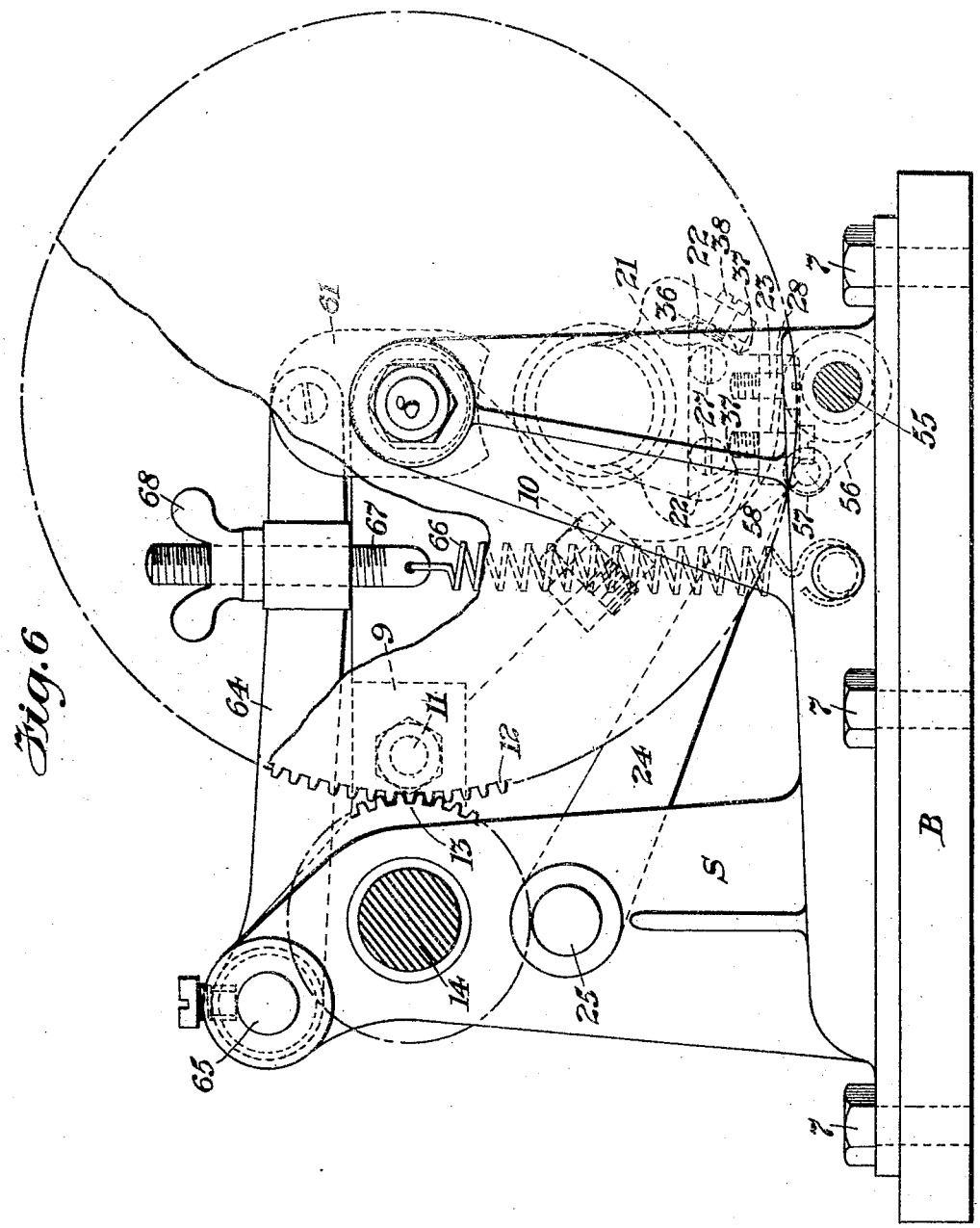

UNITED STATES PATENT OFFICE.

ALFRED G. F. KUROWSKI, OF BROOKLYN, NEW YORK, ASSIGNOR TO WILLIAM ILE, OF NEW YORK, N. Y.

APPARATUS FOR FASTENING CLOSURE-SUPPORTING MEMBERS TO TUBULAR CASINGS.

1,367,878.     Specification of Letters Patent.     Patented Feb. 8, 1921.

Application filed January 22, 1919. Serial No. 272,590.

*To all whom it may concern:*

Be it known that I, ALFRED G. F. KUROWSKI, a subject of Germany, and a resident of the borough of Brooklyn, in the county of Kings, city and State of New York, have invented new and useful Improvements in Apparatus for Fastening Closure-Supporting Members to Tubular Casings, of which the following is a specification.

This invention relates to apparatus for use in the manufacture of containers or receptacles, such as the tubular casings of electric flash lights, in which closures are adapted to be removably secured to the ends, and one of which closure in the case of flash lights consists of a lens, and it is the object of the invention to provide an improved apparatus for fastening or securing annular closure supporting members, in the nature of threaded ferrules, at opposite ends of the casing.

The casing proper or body portion of flash lights consists of a tubular member of fiber board, vulcanite and similar material, and the closure supports previously formed to shape are secured thereto by rivets or eyelets passing through the material of the casing and the closure support. As the material of the casing is tough and hard in order to secure the closure supports to the casings in this manner it is necessary to first perforate the closure supports and also the casings, which latter has usually been done by drilling, requiring several operations and the necessary time to carry out the same. In this method of securing the closure supports by the frequent screwing of the closure into place and the unscrewing of the same the supporting members become loosened. Furthermore, by securing the closure supports by rivets or eyelets it is impossible to make a tight joint between the casing and closure support thereby permitting access of moisture to the battery carried within the casing, with the result that the battery shell becomes corroded and it is impossible to remove the battery from the casing to renew the same.

It is an object of the invention to overcome the above disadvantages by securing the closure supports to the casing in such manner as to positively and permanently fix the same to the casing without any possibility of the closure supports becoming loose, and providing a tight joint with the casing, preventing access of moisture to the interior of the casing through the connection of the closure supports with the casing. For this purpose I upset or contract portions of the material of the closure support by crimping or corrugating the same and forcing the contracted portion into the material of the casing.

In the drawings accompanying and forming a part of this specification, Figure 1 is a front elevation of an apparatus showing an embodiment of my invention for carrying out the improved method of fastening closure supports to the end of tubular containers or receptacles with the parts in normal position and a container in position therein to be operated upon.

Fig. 2 is a plan view of a detail.

Fig. 3 is a cross sectional view taken substantially on the line 3—3 of Fig. 1 looking in the direction of the arrows.

Fig. 4 is an elevational view, partly in section, of an end portion of a container with a closure support mounted thereon ready to be operated upon to secure the same to the container.

Fig. 5 is a view similar to Fig. 4 but showing the closure support fastened to the container by my improved method; and Fig. 6 is an end view, partly in section, looking at the left of Fig. 1.

Similar characters of reference designate like parts throughout the different views of the drawings The embodiment of my invention shown in the drawing comprises a base B to which are secured adjacent opposite end uprights or standards S, as by bolts 7 passing through flanges of the standards S. A shaft 8 is journaled at one end in the left hand standard as viewed from Fig. 1 and at the opposite end in a bracket 9 removably secured to the standard S at the right hand end of the machine as viewed from Fig. 1 by bolts 10 and 11, whereby said shaft may be readily removed, and said end of the shaft is of reduced diameter and has a threaded portion within such reduced portion for a purpose to be hereinafter described. The shaft 8 is driven by a gear 12 fixed to said shaft meshing with a pinion 13 on a driving shaft 14 journaled in the standards S and to which the source of power is connected, (not shown). A pair of crimping tools in the form of knurls 15 and 16 are mounted upon the shaft 8 to rotate therewith and have axial adjustment as by a key and maintained upon the shaft in fixed relation by a sleeve 17 engaging between the hub of the gear 12 and the tool 15, and an elongated spacing sleeve 18 engaging between the tools 15 and 16, and the tool 16 being retained or locked on the shaft by a nut 19. By this arrangement sleeves 18 of different lengths may be utilized thereby adapting the apparatus to operate upon containers of different lengths.

A bar 21 extends longitudinally of and between the standards S and is of a cross sectional form substantially as shown in Figs. 3 and 6 with the top surface in a horizontal plane and a portion of the longitudinal sides converging or inclining inward from the top downward as shown at 22 to form a slideway for a purpose hereinafter set forth. The bar 21 is secured adjacent opposite ends by bolts 23 upon the ends of arms 24 mounted at the opposite ends to and extending forward from a shaft 25 mounted at opposite ends in the standards S.

A bracket 26 is secured to one end of the bar 21 by bolts 27, 28 to extend upward. A stud 29 is fixed in said bracket, as by a pin, and upon which stud a head or mandrel 30 having an annular flange 31 is rotatably mounted by a ball bearing 32 and secured upon the stud by a screw 33. A bracket 35 is slidably mounted upon the bar 21, said bracket having parts to embrace the opposite longitudinal sides of the bar and arranged to engage said bar at the juncture of the inclined walls 22 with the upper horizontal face, as at 36, and the juncture of such inclined walls with a vertical portion of the side walls, as at 37, whereby said bracket may be mounted upon the bar by placing the same over the top of the bar, and the slide bracket 35 is maintained in position and prevented from having lateral movement by set screws 38. This bracket has an upwardly extending arm 39 with a stud 40 fixed therein by a pin coaxial with the stud 29. A head or mandrel 41 having an annular flange 42 similar to the mandrel 30 is mounted upon the stud 40 by a ball bearing 43 and secured thereon by a headed screw 44.

The mandrels or heads 30 and 41 are adapted to engage in opposite ends of and rotatably support a container C, such as a flash light casing, with the end closure supports 45 thereon, the flanges 31, 42 of the respective mandrels engaging with a flanged portion 46 of the closure supports and operating to clamp such closure supports and the casing together.

To mount the casing upon the mandrels 30, 41, the mandrel 41 is adjusted axially away from the mandrel 30 by the adjustment of its support upon the bar 21, one end of the casing being placed upon the mandrel 30 and the other mandrel 41 is adjusted to cause it to engage in the opposite end of the casing as shown in Fig. 1. The mandrel 41 is adjusted by a two-arm lever pivotally supported upon the bar 21 by a headed and shouldered stud 47, the long arm 48 of the lever serving as an operating handle and the shorter arm being pivotally connected, as at 50, to one end of a link 51, the opposite end of the link being pivotally connected, as at 52, to the slidable bracket supporting the mandrel 41. By moving the lever in the direction of the arrow, Fig. 2, the mandrel 41 will be moved toward the mandrel 30, and the length of the link 51 is so arranged that as the lever 48 is moved to its full forward position to clamp a casing between the mandrels the axis of the pivotal connection of the link 51 with the lever will be in alinement with the axes of the pivotal connections of the link with the mandrel support 35 and the pivot of the lever operating in the nature of a toggle to lock the mandrels in casing clamping position. It will be obvious that by moving the lever 48 in a direction opposite to that indicated by the arrow that the mandrel carrying support 35 will be moved to releasing position.

To bring the crimping tools or knurls 15, 16 and end closure supports with a casing on the mandrels in operative relation the mandrels are movable toward and away from said tools. For this purpose the bar 21 is pivotally connected to a rock shaft 55 by a pair of arms 56 fixed to and extending laterally from said shaft engaging between a bifurcation of lugs 57 secured to the bottom of the bar 21, a stud 58 passing through openings in the bifurcated portion of the lugs and the arms and secured in the lugs by pins 59. The shaft 55 may be rocked in a suitable manner, and as shown is adapted to be rocked by a hand operated crank 60 fixed to the projecting end of the shaft. It will be obvious that by pulling the crank forward the forward ends of the arms 24 will be moved upward and therewith the mandrel carrying bar 21 causing the mandrels with the casing thereon to move toward the crimping tools and the tools to engage with the end closure supports adjacent their inner extremities, the tools being positively driven roll around the end closure supports and revolve said supports with the casing and the mandrels upon the mandrel supporting studs. The end closure supports are forcibly maintained in engagement with the crimping tools and thereby the knurls upon the tools will crimp or contract alternate portions of the material of the end closure supports and embed such contracted portions of the material into the material of the casing or container thereby making a connection between the end closure supports and casing of sufficient tightness to prevent moisture entering therethrough.

The crimping or contracting of the material of the end closure supports in fastening the same to the casing has a tendency to curl the inner extremity of the supports laterally from the casing, leaving rough edges with the possibility of injury to the user, and to maintain this inner end in firm contact with the casing the smooth burnishing tools 61 are provided. These tools are in the form of plates having an elongated orifice 62 for the passage of the shaft 8 and sleeve 18 and to permit said tools to have movement transversely of said shaft and sleeve. The plates have a curved portion 63 to engage the end closure support, (Fig. 3). These tools are pivotally carried at the forward end of arms 64 swung from a shaft 65 fixed in the standards S and so located and arranged to lie contiguous to the crimping tools or knurls 15, 16, as clearly shown in Fig. 1. The burnishing tools are yieldingly urged downward or toward the mandrels by springs 66 the lower ends of which are connected to a pin fixed in the standards and the other ends connected to threaded bolts 67 passing through perforations in the arms 64 and have thumb nuts 68 thereon to engage the upper face of the arms and whereby the tension of the springs may be increased or decreased as desired. To permit of adjustment of the burnishing tools longitudinally of the shaft 65 and to maintain them in adjusted position they are mounted between collars 69 on said shaft secured thereto by set screws 70.

In operation the crimping tool carrying shaft 8 with said tools is continuously rotated. One end of a casing with the end closure supports thereon is then mounted upon the mandrel or head 30 and held in position for engagement of the other mandrel 41 in the opposite end of the casing with the end closure support thereon, when the support for said latter head is moved by the lever 48 toward the head 30 to clamp the casing on the heads between the head flanges 31, 42, said flanges engaging with the flanged ends of the end closure supports firmly clamping said closure supports and the casing together. In this position of the mandrels the crank 60 is pulled forward thereby raising the bar 21 and with said bar the mandrels and moving the casing to position for the crimping and burnishing tools to engage and operate upon the closure support in the manner as set forth, the crimping tools rotating the casing with the mandrels and thereby rolling around the closure supports on the casing. After the material of the closure supports has been operated upon by the crimping tools and portions of said supports have been contracted and embedded in the material of the casing, the crank is moved backward and the mandrel 41 is released from the one end of the casing by the lever 48 when the casing is removed from the other mandrel 30 and the operation of inserting another casing is repeated.

Having thus described my invention, I claim:

1. In apparatus for the purpose specified, a crimping tool, and a revoluble support for a casing and a closure support, said rotatable support being movable to position with the closure support on the casing in engagement with the crimping tool.

2. In apparatus for the purpose specified, a rotatable crimping tool, a rotatable mandrel to engage in and support a casing with an end closure support thereon, and a support for a mandrel operable to move the mandrel toward and away from the crimping tool.

3. In apparatus for the purpose specified, a rotatable crimping tool, a pair of revoluble heads in axial alinement and one of which is axially movable toward and away from the other to engage in opposite ends of and support a casing with end closure supports thereon; and means upon which said heads are mounted operative to move the heads toward and away from the crimping tool.

4. In apparatus for securing end closure supports to tubular casings, a rotatable crimping tool, a rotatable mandrel to engage in and support a casing with an end closure support thereon; and means upon which the mandrel is mounted operable to move the mandrel to position with the crimping tool to engage the closure support adjacent its inner end, and yielding means to engage the casing and inner edge of the closure support as the mandrel is moved toward the crimping tool for the purpose specified.

5. In apparatus for securing end closure supports to tubular casings, a pair of rotatable crimping tools; a rotatable head to engage in and support one end of a casing with an end closure support and clamp the latter thereon; a pivotally mounted support for said head, a second rotatable head to engage in and support the casing at the opposite end with an end closure support and clamp the latter thereon mounted upon the support for the first head in axial alinement therewith and have movement toward and away from the first head support; and means to move the head support toward the crimping tool for operation thereby upon the closure supports upon the casing to contract portions thereof and embed the same in the material of the casing for the purpose specified.

6. In apparatus for securing end closure supports to tubular casings, comprising means to rotatably support a casing with the closure support in clamped position thereon, and means with which the closure support on the casing is adapted to be brought into contact to contract portions of the closure support and embed said contracted portion in the material of the casing for the purpose specified.

7. In apparatus for securing closure supports to tubular casings, comprising means to engage in and rotatably support a casing at opposite ends with a closure support clamped on opposite ends, and means toward which the casing support is movable by placing the closure supports on the casing in contact therewith to operate simultaneously upon both the closure supports on the casing to contract portions thereof and embed the same in the material of the casing for the purpose specified.

8. In apparatus for securing closure supports to tubular casings, a pair of crimping tools; a pair of rotatable mandrels to engage in opposite ends of and support a casing with end closure supports thereon and clamp the two together; a support for said mandrels operable to move the same toward the crimping tools for operation upon the closure supports to contract portions of said supports and embed the same in the material of the casing, comprising a bar, an arm fixed to one end of the bar carrying one of the mandrels, a head slidably mounted on said bar carrying the other mandrel to have movement toward and away from the first mandrel; and means to actuate said support to move the mandrels toward and away from the crimping tools for the purpose specified.

9. In apparatus for securing closure supports to tubular casings, a pair of crimping tools; a pair of rotatable mandrels to engage in opposite ends of and support a casing with end closure supports thereon, and clamp the two together; a support for said mandrels operable to move the same toward the crimping tools for operation upon the closure supports to contract portions of said supports and embed the same in the material of the casing, comprising a bar, an arm fixed to one end of the bar carrying one of the mandrels, a head slidably mounted on said bar carrying the other mandrel to have movement toward and away from the first mandrel; a crank shaft operatively connected to the mandrel support to actuate the support to move the mandrels toward and away from the crimping tools for the purpose specified.

10. In apparatus for securing closure supports to tubular casings, a pair of crimping tools; a pair of rotatable mandrels to engage in opposite ends of and support a casing with end closure supports thereon, and clamp the two together; a support for said mandrels operable to move the same toward the crimping tools for operation upon the closure supports to contract portions of said supports and embed the same in the material of the casing, comprising a bar, an arm fixed to one end of the bar carrying one of the mandrels, a head slidably mounted on said bar carrying the other mandrel to have movement toward and away from the first mandrel; a lever connected to said mandrel carrying head to impart movement to said head; and a rock shaft connected to the bar operable to impart movement to the bar to move the mandrels toward and away from the crimping tools for the purpose specified.

11. In apparatus for securing closure supports to tubular casings; a pair of crimping tools; a pair of rotatably supported mandrels, one of which is axially adjustable toward and away from the other, to engage in opposite ends of and support a casing with closure supports thereon and arranged to clamp the closure supports and casing together; means to move the mandrels to position for operation upon the closure supports on the casings by the crimping tools to contract portions of said closure supports and embed the contracted portions in the material of the casing; and burnishing tools to engage the casing and the inner ends of the closure supports thereon as said means are moved to position for operation thereon by the crimping tools for the purpose specified.

12. In apparatus for securing closure supports to tubular casings; a pair of crimping tools; a pair of rotatably supported mandrels, one of which is axially adjustable toward and away from the other, to engage in opposite ends of and support a casing with closure supports thereon and arranged to clamp the closure supports and casing together; means to move the mandrels to position for operation upon the closure supports on the casings by the crimping tools to contract portions of said closure supports and embed the contracted portions in the material of the casing; a pair of pivotally supported arms; and burnishing tools carried by said arms, said arms with the burnishing tools being yieldingly urged toward the mandrels for the purpose specified.

13. In apparatus for securing closure supports to tubular casings, a rotatable shaft; a pair of crimping tools adjustably mounted on said shaft; a pair of rotatably supported mandrels one of which is movable toward and away from the other, to engage in opposite ends of and support a casing with closure supports thereon and clamp the closure supports and casing together; a movable support for said mandrels operable to move the mandrels to position for operation upon the closure supports on the casing by the crimping tools to contract portions of the closure supports and embed the contracted portions in the material of the casing; a fixed shaft; a pair of arms pivotally mounted upon said shaft and to have adjustment along the same; burnishing tools carried by said arms; and springs to yieldingly urge the arms with the burnishing tool in a direction toward the mandrels for the purpose specified.

ALFRED G. F. KUROWSKI.